(No Model.)  2 Sheets—Sheet 2.

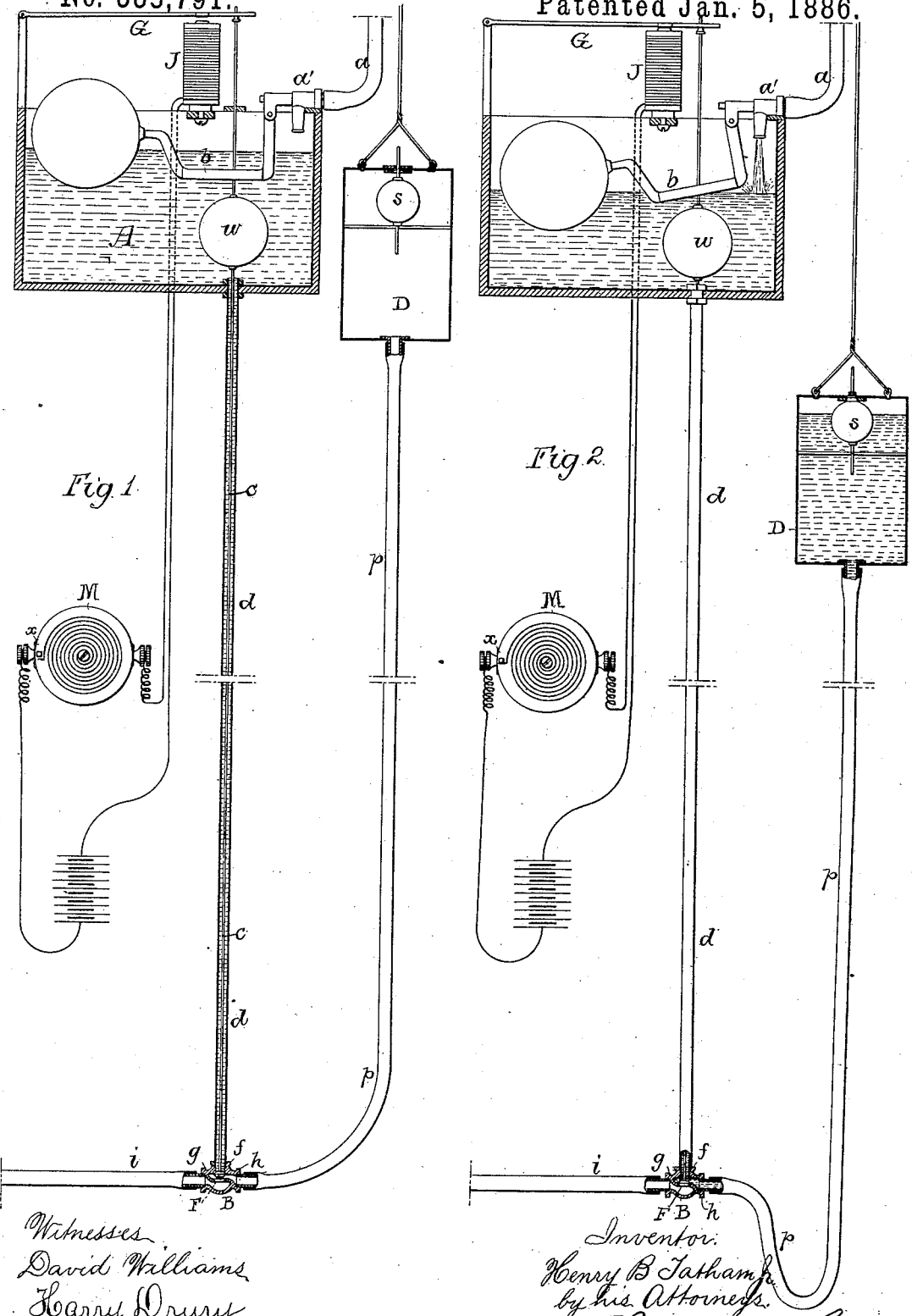

H. B. TATHAM, Jr.
AUTOMATIC REGULATING MECHANISM FOR HEATING AND VENTILATING APPARATUS.

No. 333,791. Patented Jan. 5, 1886.

Witnesses
David Williams
Harry Drury

Inventor
Henry B Tatham Jr.
by his Attorneys
Howson & Sons

UNITED STATES PATENT OFFICE.

HENRY B. TATHAM, JR., OF PHILADELPHIA, PENNSYLVANIA.

AUTOMATIC REGULATING MECHANISM FOR HEATING AND VENTILATING APPARATUS.

SPECIFICATION forming part of Letters Patent No. 333,791, dated January 5, 1886.

Application filed July 23, 1883. Serial No. 101,639. (No model.)

To all whom it may concern:

Be it known that I, HENRY B. TATHAM, Jr., a citizen of the United States, and a resident of Philadelphia, Pennsylvania, have invented certain Improvements in Automatic Regulating Mechanism for Heating and Ventilating Apparatus, of which the following is a specification.

The object of my invention is to provide mechanism whereby the heating or ventilation of rooms or apartments may be automatically regulated, and this object I attain in the manner which I will now proceed to describe, reference being had to the accompanying drawings, in which—

Figure 4:
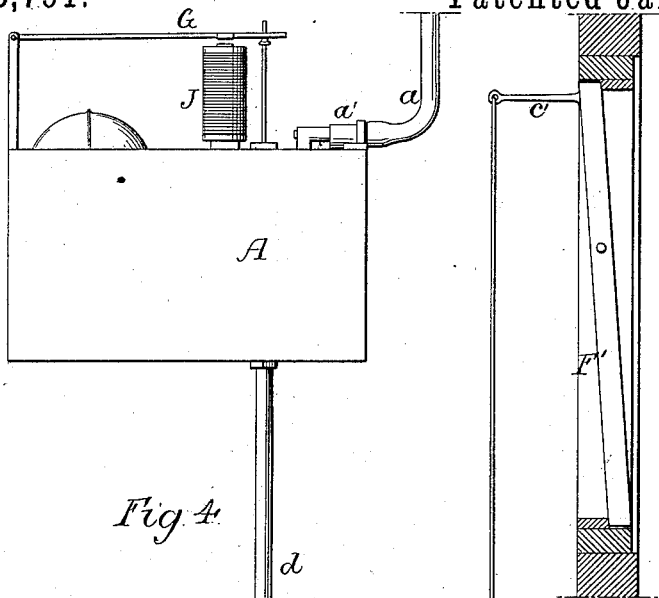
Figure 5:
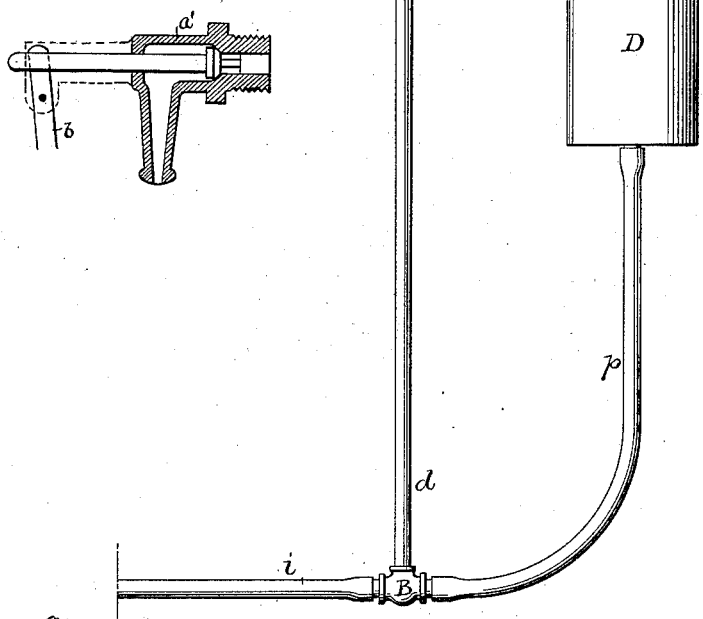
Figure 3:
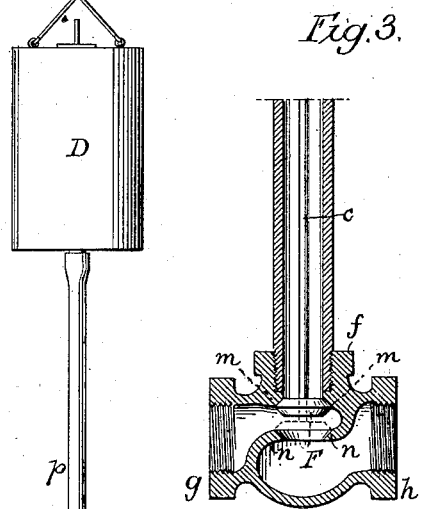

Figure 1 is a sectional view of apparatus constructed in accordance with my invention; Fig. 2, the same, with some of the parts in a different position; Fig. 3, an enlarged view of part of the same, and Fig. 4 a side view of a complete form of apparatus embodying my invention. Fig. 5 is an enlarged section of the inlet-valve shown in Figs. 1, 2, and 4.

My invention consists of apparatus in which water or other liquid is used to operate a damper or valve in the heating or ventilating apparatus of a room or apartment, the flow of the liquid being regulated by valves controlled by an electro-magnet under the influence of a thermostat in said room or apartment.

In the drawings, A represents an elevated tank or reservoir, which receives a supply of water from any suitable source through a pipe, a, and a valve, a', controlled by a float-lever, b, the tendency of which is to maintain the water in the tank A at the level shown in Fig. 1. A pipe, d, affords communication between the tank and a valve-casing, B, of the character shown in Fig. 3, this casing having two valve-seats, m and n, and three branches, f, g, and h, the branch f being connected to the pipe d, the branch g to a waste-pipe, i, and the branch h to a pipe, p, which communicates with a hollow vessel, D, suspended in the present instance from the arm c' of a window, F', as shown in Fig. 4, said vessel having an opening in the top and an internal float-valve, s, to close said opening, as described hereinafter.

To the casing B is adapted a valve, F, the stem C of which passes up through the pipe d and tank A, and is attached to the armature-lever G of an electro-magnet, J, in the circuit of which is a thermostat, M, consisting in the present instance of a simple metallic coil connected to one of the wires, the other wire being connected to a stud, x, adjacent to the free end of the coil.

Any desired form of expansion thermostat for making and breaking an electrical circuit as it expands and contracts under the influence of varying degrees of temperature may, however, be used in place of that shown, which has been selected simply as an example, and because it has been found to be simple and effective in its operation. Supposing this thermostat to be located in a room or apartment of which F' is one of the windows, so long as the temperature of the room remains below a certain point the free end of the thermostat coil is not brought into contact with the stud x, and the circuit through the magnet J is not completed, the armature-lever consequently remaining elevated, for on the stem of the valve F is a float, w, which, being immersed in the water in the tank A, by its buoyancy balances the weight of water on the valve F, and maintains the same in contact with the seat m, so as to prevent the flow of water to the vessel D, the weight of the latter being insufficient to overcome the preponderance of weight tending to keep the window F' closed. (See Figs. 1 and 4.) As soon as the temperature in the room, however, reaches such a point that the expansion of the thermostat-coil brings its free end into contact with the stud x, the circuit through the magnet J is completed, the armature is attracted, and the valve F moved from the seat m onto the seat n, as shown in Fig. 2. Water is thus permitted to flow through the pipes d and p from the tank A to the vessel D, which soon becomes weighted sufficiently to cause it to open the window F', the parts remaining in this position until the temperature of the room is so reduced that the contraction of the thermostat-coil will free its end from contact with the stud x, thereby again breaking the circuit and causing a restoration of the valve F to the position shown in Fig. 1. The water is now permitted to escape from the vessel D through the pipes *p* and *i*, and the window F' is gradually closed.

Air is permitted to escape from the vessel D through the top opening as the water enters from below, and overflow of the water is prevented by the float-valve *s*, which closes the opening before the water reaches the same.

Although I have shown the device as applied to the opening of a window or ventilator, it may be used as well for operating a valve or damper in a pipe for supplying hot air, for controlling the draft of a furnace, for operating a valve in the supply-pipe of a gas-heater, or for raising and lowering the wick of a lamp used for heating purposes. The construction of the device may also be modified in various ways within the scope of my invention. For instance, instead of the vessel D being connected directly to a damper or ventilator, it may be connected to the operating-lever of the governing-valve of hydraulic mechanism for operating a valve or damper, as described in a separate application for patent made by me herewith, Serial No. 101,638, and instead of admitting water to and discharging it from a vessel, so as to cause the operation of the latter by the weight of the water, a float may be used, the said float rising and falling with the level of the water in the vessel containing the same, and independent supply and discharge valves may be used, as also described in the application above alluded to. In fact the present apparatus may be modified in many of the ways set forth in said application, the main difference between which and the present case is in the use of an electro-magnet for operating the valves instead of operating the latter directly by the thermostat.

I claim as my invention—

1. The combination of a liquid-receiver forming part of a device for operating a valve or damper, an elevated liquid-reservoir, a pipe communicating with said reservoir and with the liquid-receiver, valves whereby the liquid is caused to flow from the elevated reservoir to the receiver or is discharged from the latter, an electro-magnet the armature of which is connected to said valves, and a thermostat for making and breaking the circuit through the magnet, all substantially as specified.

2. The combination of a damper-actuating device, a vessel, D, suspended therefrom, an elevated liquid-reservoir, A, a pipe, *d*, communicating therewith and having a flexible connection with the vessel D, valves whereby the liquid is caused to flow from the elevated reservoir to the vessel D or is discharged from the latter, an electro-magnet the armature of which is connected to said valves, and a thermostat for making and breaking the circuit through said electro-magnet, all substantially as specified.

3. The combination of a liquid-receiver forming part of a device for operating a valve or damper, an elevated liquid-reservoir, A, a pipe, *d*, communicating therewith, a valve-casing, B, having seats *m* and *n*, a branch, *h*, communicating with the liquid-receiver, a branch, *f*, communicating with the pipe *d*, and a branch, *g*, communicating with a waste-pipe, a duplex valve adapted to said seats *m* and *n*, an electro-magnet the armature of which is connected to the valve, and a thermostat for making and breaking the circuit through said magnet, all substantially as specified.

4. The combination of the liquid-receiver forming part of a device for operating a valve or damper, an elevated liquid-reservoir, A, a pipe, *d*, communicating therewith, a valve-casing, B, having two seats, *m* and *n*, a branch, *h*, communicating with the liquid-receiver, a branch, *f*, communicating with the pipe *d*, and a branch, *g*, communicating with the waste-pipe, a duplex valve adapted to said seats *m* and *n*, a valve-rod having a submerged float, *w*, an electro-magnet the armature of which is connected to said valve-rod, and a thermostat for making and breaking the circuit through said magnet, all substantially as specified.

In testimony whereof I have signed my name to this specification in the presence of two subscribing witnesses.

H. B. TATHAM, Jr.

Witnesses:
  HARRY DRURY,
  HARRY SMITH.